J. C. OLIVER.
SIDE SPRING BUGGIES.

No. 176,802.    Patented May 2, 1876.

Witnesses:
A. Ruppert.
A. C. Cassell

J. C. Oliver
Inventor.
D. T. Holloway & Co.
Atty

UNITED STATES PATENT OFFICE.

JAMES C. OLIVER, OF LOUISVILLE, KENTUCKY.

IMPROVEMENT IN SIDE-SPRING BUGGIES.

Specification forming part of Letters Patent No. 176,802, dated May 2, 1876; application filed January 6, 1876.

*To all whom it may concern:*

Be it known that I, JAMES C. OLIVER, of Louisville, in the county of Jefferson and State of Kentucky, have invented a new and useful Improvement in Side-Spring Buggies, of which the following is a specification:

This invention relates to that class of buggies or other vehicles in which the bodies are hung to the side springs in such a manner as to permit of a limited longitudinal or oscillating movement of the former for the purpose of deadening the force of shocks experienced on passing over uneven ground.

Heretofore the body of such vehicle has been connected to the side springs by means of crank-shafts, the crank-wrists of which turned in the looped ends of the springs, while the straight end of the shaft turned in bearings on the bottom of the body.

My improvement consists in hanging or suspending the body of the vehicle between the side springs by means of links connected with said springs, and rods rigidly attached to the bottom of the body.

Figure 1:
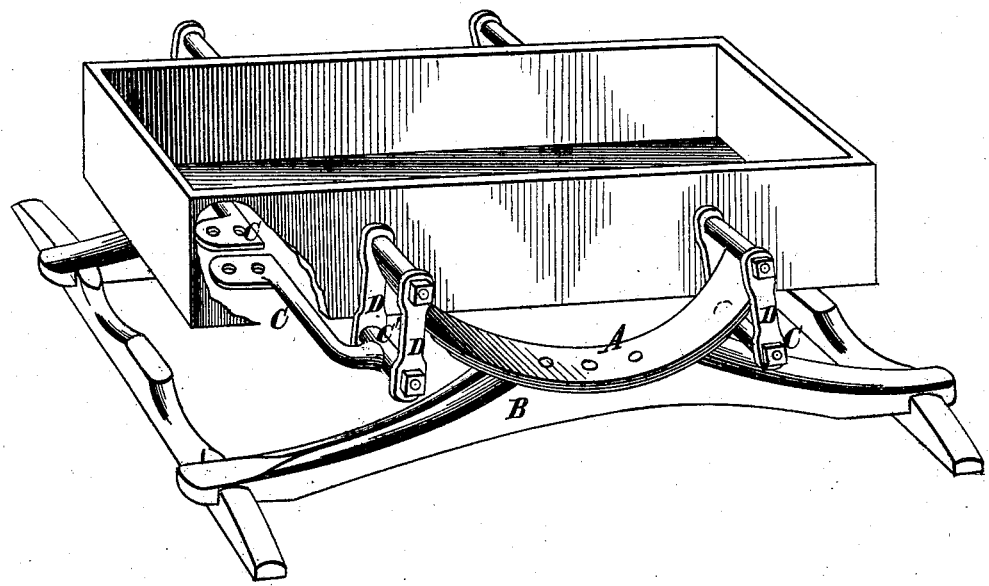
Figure 2:
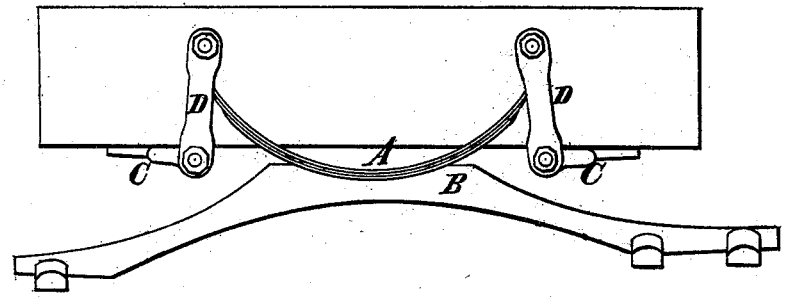

In the annexed drawings, Figure 1 is a perspective view of a portion of a vehicle embodying my improvement. Fig. 2 is a side elevation thereof.

The same letters of reference are used in both figures in the designation of identical parts.

The side springs A, which are attached to the running gear of the vehicle B in the usual manner, are composed of a number of leaves, the ends of the top leaf being voluted. From rods passing through these ends are suspended links D, in the lower ends of which the cross-heads C' of the rods C are journaled. These rods C are firmly attached to the bottom of the vehicle. In order to more effectually guard against lateral movement of the body I make the connection of the cross-heads C' with the springs A by means of two links, placing one on either side of the springs.

This arrangement of hanging or suspending the body of the vehicle between the side springs in the manner described will permit of an easy longitudinal swinging motion of the same, the shocks experienced on crossing railroad tracks and other obstacles are quite deadened, the disagreeable lateral motion is entirely obviated, and the danger consequent on the overbalancing of the body of the vehicle, and which not unfrequently causes the occupants to be thrown out, is greatly diminished.

What I claim as my invention, and desire to secure by Letters Patent, is—

The combination of the body B, the rods C rigidly secured thereto, the links D, and the side springs A, all substantially as and for the purpose specified.

In testimony whereof I have signed my name to this specification in the presence of two subscribing witnesses.

JAMES C. OLIVER.

Witnesses:
M. RABBETH,
JAS. WEHLE.